Figure 1:
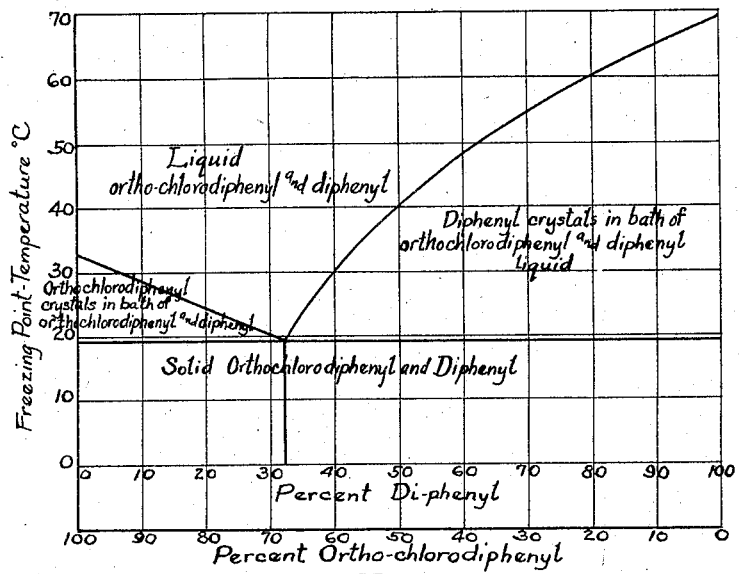
Figure 2:
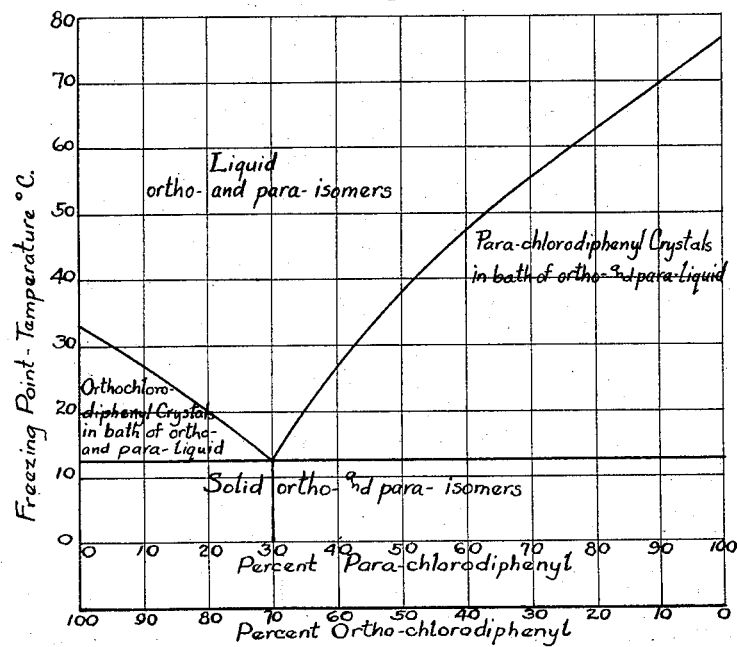
Figure 3:
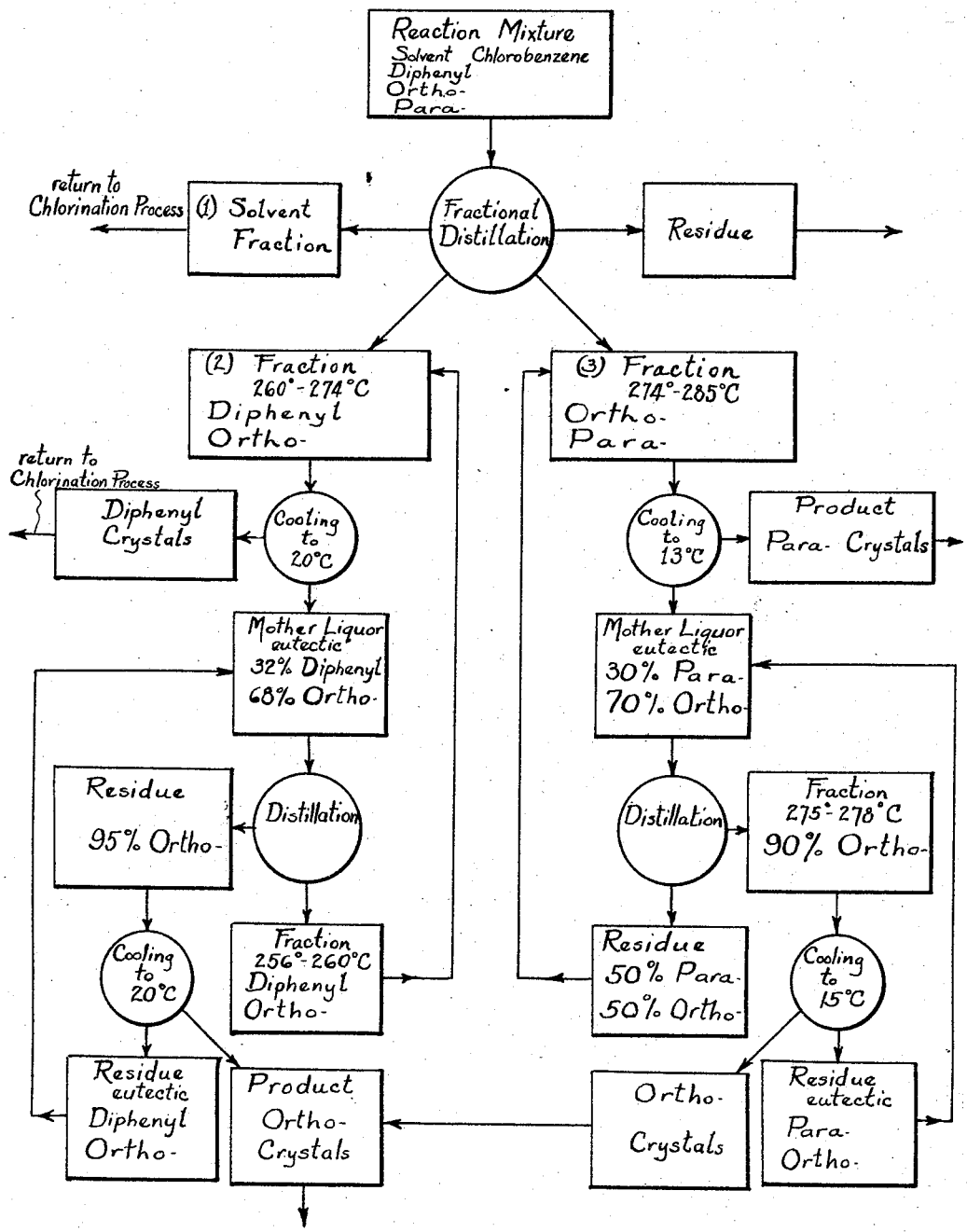

Dec. 6, 1932.   E. C. BRITTON ET AL   1,890,427
PROCESS FOR SEPARATING CHLORODIPHENYLS
Filed Dec. 22, 1930   2 Sheets-Sheet 1

INVENTORS
Edgar C. Britton and
BY Wesley R. Stoesser
Thomas Griswold, Jr.
ATTORNEY Patented Dec. 6, 1932

1,890,427

UNITED STATES PATENT OFFICE

EDGAR C. BRITTON AND WESLEY C. STOESSER, OF MIDLAND, MICHIGAN, ASSIGNORS TO THE DOW CHEMICAL COMPANY, OF MIDLAND, MICHIGAN, A CORPORATION OF MICHIGAN

PROCESS FOR SEPARATING CHLORODIPHENYLS

Application filed December 22, 1930. Serial No. 503,938.

This invention is concerned with the separation of ortho- and para-monochlorodiphenyls from a mixture containing the same, especially with a process for obtaining separately the several components from a product resulting from chlorinating diphenyl wherein the mono-chloro derivatives are the principal constituents.

When diphenyl is chlorinated in a chlorobenzene solution or other solvent in the presence of a catalyst, for instance metallic iron, a reaction mixture containing various chlorinated derivatives of diphenyl is obtained, comprising therein ortho- and para-monochlorodiphenyls. To obtain the most favorable yield of these two compounds and avoid formation of dichloro compounds, the chlorination should be carried only to a point where considerable diphenyl remains unchlorinated, which must be separated from reaction product. This reaction mixture may be separated to some extent into its components by repeated fractional distillation thereof. The separation of the aforesaid fractions into their constituents is difficult in view of the respective boiling points thereof, namely, diphenyl, 254.9° C.; ortho-chlorodiphenyl, 268° C.; para-chlorodiphenyl, 282° C.; and meta-chlorodiphenyl, 284°–285° C.. if present. To accomplish this separation, fractionating equipment capable of very accurate control is necessary. However, such a procedure has not resulted satisfactorily in a practical way because of the numerous repetitions of such fractionation required and because of the resulting low yield of purified product obtained from each such fractionation. Furthermore, the degree of control demanded is not readily obtainable in a commercial process.

We have now found that the aforesaid chlorinated mixture may advantageously be separated into its components by an improved process, combining both fractional distillation and crystallization steps, which requires merely an ordinary degree of control. We first distill to separate into fractions, one fraction containing the unreacted diphenyl and part of the ortho-chlorodiphenyl practically free from the para-isomer, and the other fraction containing substantially all of the para-chlorodiphenyl together with the remainder of the ortho-compound. Such fractions may then be separated into their components by crystallization under suitable conditions, the individual compounds being obtained thereby substantially pure and in satisfactory yield. By this improved method of separation we are able to purify either of the aforesaid compounds as desired to obtain such purified products as are demanded in the dye, plastic, pharmaceutical, and other allied industries. Accordingly, our invention resides in the steps hereinafter fully described and particularly pointed out in the claims, the annexed drawings and following description setting forth in detail certain procedure whereby the principle of our invention may be used.

In said annexed drawings:—

The charts there appearing show, respectively, the freezing point curves of mixtures containing diphenyl and ortho-chlorodiphenal in Fig. I and ortho- and para-chlorodiphenyls in Fig. II. Fig. III is a flow sheet diagrammatically illustrating the sequence of interconnected and related steps in our improved process.

The reaction mixture consisting of diphenyl and chlorinated diphenyls to be separated by our improved method is conveniently obtained by a method described in a pending joint application of E. C. Britton and W. C. Stoesser, Serial No. 373,473, filed June 24, 1929 now Patent No. 1,835,754. Example III of such application is particularly applicable to the present purpose; however, in place of benzene we preferably employ chlorobenzene as a solvent. A typical reaction mixture after distilling off the solvent, therefore, for example, may consist of 15 to 30 per cent of unreacted diphenyl, 25 to 40 per cent of ortho-chlorodiphenyl and 25 to 40 per cent of para-chlorodiphenyl, and a residue of 5 to 20 per cent of higher chlorinated diphenyl derivatives, principally dichlorodiphenyls, which are crystalline. Tarry materials may also be present.

To illustrate the crystallization phase of our process, charts showing the freezing points of mixtures comprising the two fractions are given. As shown in Fig. I, by cooling a given mixture of diphenyl and ortho-chlorodiphenyl to approximately 19° C. an eutectic composition containing approximately 68.4 per cent ortho-chlorodiphenyl and 31.6 per cent diphenyl is obtained. In Fig. II a mixture of ortho- and para-chlorodiphenyls, when cooled to about 13° C., gives an eutectic composition made up of approximately 70 per cent ortho- and 30 per cent para-chlorodiphenyls.

Referring to Fig. III of the drawings, the sequence of steps is shown diagrammatically, the order of the movement of materials and intermediate products being indicated by the arrows. Beginning with the aforementioned reaction mixture, the same is first made alkaline, e. g. by addition of NaOH or $Na_2CO_3$, to remove hydrogenchloride therefrom and then fractionally distilled to prepare thereby successive fractions consisting substantially (1) solvent, e. g. chlorobenzene, which may be returned to the chlorinating process; (2) diphenyl and ortho-chlorodiphenyl; (3) ortho- and para-chlorodiphenyls, including any of the meta isomer, if present; and leaving a residue of 5 to 20 per cent of the original volume, such residue comprising a mixture of poly-chlorodiphenyls and tarry material. After removing the first fraction containing the solvent, the second fraction is taken at a temperature of about 260° to 274° C. at which said fraction may contain approximately equal amounts of diphenyl and ortho-chlorodiphenyl. These proportions may be obtained without any appreciable amount of the para-chlorodiphenyl distilling over. By further distilling at a temperature of about 274° to 284° C. the remaining ortho-chlorodiphenyl and practically all of the corresponding para-compound are obtained in the third fraction.

To divide fraction (2), as designated in Fig. III, the same is preferably cooled to a temperature between 19° and 25° C., e. g. a point slightly above the eutectic as shown in Fig. I, when as much as 30 per cent of diphenyl crystals are formed, which may be centrifuged or otherwise separated from the mixture, the temperature of the mother liquor being such as to maintain the diphenyl in crystalline form. The above eutectic residue mother liquor, which contains from about 65 to 70 per cent of ortho-chlorodiphenyl and 30 to 35 per cent diphenyl, is now distilled at a temperature between about 256° and 260° C. to obtain a fraction containing about equal proportions of diphenyl and ortho-chlorodiphenyl, which is returned to the original (2) fraction mixture. The still residue from the above distillation, which may contain upwards of 95 per cent of the ortho-compound is subsequently cooled to around 20° C. as before, whereby crystallization is induced and the crystals of pure ortho-chlorodiphenyl may be separated out. The eutectic residue obtained therefrom may then be returned to one of the crude intermediate fractions, as shown. It may be advantageous in certain instances to dissolve the above still residue in a suitable solvent, e. g. ethyl alcohol, methyl alcohol, etc., and then separate the orthochlorodiphenyl therefrom by cooling the mixture.

The procedure for separating the so designated fraction (3) in Fig. III is generally similar to that just described.

This liquid fraction, which may contain the ortho- and para-chlorodiphenyls in practically equal proportions, is cooled to about 13° to 17° C., e. g. a point slightly above the eutectic as shown in Fig. II, when substantially pure crystals of para-chlorodiphenyl are formed and are centrifuged or otherwise removed from the mother liquor. By repeated cooling the para-isomer may be to a large extent removed from the mother liquor, except, of course, that required to form an eutectic mixture, which contains in the vicinity of 70 per cent of ortho- and 30 per cent of para-chlorodiphenyls. Said oily eutectic mixture may now be distilled, a temperature range of about 275° to 278° C. being most suitable, and the fraction thus obtained, which may contain even in excess of 90 per cent of ortho- and the remainder para-chlorodiphenyl, may be further cooled, preferably to about 13° C. as employed in a former step, whereby practically pure ortho-chlorodiphenyl is obtained and is separated as previously described. Here also, as in fraction (2), it may be of advantage to crystallize the ortho- and para-chlorodiphenyls from a solvent. The residue from the last distillation, that may contain about equal parts of the ortho- and para-isomers, is returned to the former step as shown in Fig. III, and may be reworked with a subsequent fraction. By this method over half of the original mixture may be resolved into its pure constituents in a single cycle.

The following examples will illustrate a preferred way of carrying out the various steps of our process:—

*Example I*

A mixture of 1000 grams of the liquid fraction consisting of about 50 per cent diphenyl and 50 per cent ortho-chlorodiphenyl, and which has a freezing point of 40.5° C., was cooled to 20° C. 268 grams of diphenyl crystals were separated out leaving a liquid residue containing approximately 68.4 per cent ortho-chlorodiphenyl and 31.6 per cent diphenyl. The oily residue was now distilled, thereby obtaining 434 grams of a mixture of about equal proportions of diphenyl and ortho-dichlorodiphenyl which was returned to the original mixture above and a residue of 298 grams of a product containing in excess of 95 per cent of ortho-chlorodiphenyl. By cooling the ortho-chlorodiphenyl mixture just separated to approximately 20° C., 251 grams of practically pure ortho-chlorodiphenyl and 47 grams of the eutectic mixture remaining were obtained, the latter of which was returned to the oily residue in the former step and redistilled as there described.

Example II 900 grams of a mixture consisting of about equal amounts of the ortho- and para-chlorodiphenyls, and which has a freezing point of about 37° C. was cooled to around 13° C. whereby crystallization was induced and 257 grams of the para-isomer crystals separated out leaving a liquid eutectic residue containing approximately 70 per cent of the ortho- and 30 per cent of the para-chlorodiphenyls. Said residue was now distilled whereby there was obtained 285 grams of a mixture containing in excess of 95 per cent ortho-chlorodiphenyl, and a residual solution of 358 grams consisting of ortho- and para-chlorodiphenyls in nearly equal proportions, which was returned to the first step of the present separation. The ortho-chlorodiphenyl mixture above was now cooled to approximately 13° C. and filtered, thereby obtaining 237 grams of pure ortho-chlorodiphenyl and 48 grams of the eutectic mixture, e. g. containing about 70 per cent ortho- and 30 per cent para-chlorodiphenyls, the latter of which was returned to the liquid eutectic residue of similar composition in a former step.

It is noted that "seeding out" or other well known manipulation may be resorted to in the crystallization steps of our process if difficulty is encountered therein. We furthermore preferably cool the liquors to be crystallized to a temperature slightly in excess of the eutectic temperature thereof, thus removing the possibility of forming crystals of the eutectic mixture which would be removed along with the pure product desired, thus contaminating the same.

Although our improved method is generally applicable to the separation of the ortho- and para-monochlorodiphenyls from mixtures containing the same, yet when an excess of diphenyl is needed in carrying out the chlorination step and is therefore present in the mixture with the isomers, in such instance the separation of the diphenyl from said isomers becomes an essential part of the process. If the above mixture of substantially only three components contains in addition a solvent, distillation will be the first step, by means of which the solvent will be removed as fraction (1), and in the two successive distillation steps as illustrated in Fig. III, two fractions, there designated as (2) and (3) are obtained. If, however, the mixture contains largely only diphenyl and ortho-chlorodiphenyl, or ortho- and para-chlorodiphenyls, either cooling or distillation may be the first step, depending upon the proportions in which they exist in the mixture.

For the diphenyl-ortho-chlorodiphenyl mixture it will be seen by inspection of Fig. I that if such mixture contains the diphenyl constituent in less than the eutectic ratio, cooling will be in order to separate ortho-chlorodiphenyl crystals in a mother liquor of diphenyl and ortho-chlorodiphenyl, whereas if the diphenyl is present in proportion greater than the eutectic ratio, cooling will be practiced to separate diphenyl crystals; but, if again, the constituents be present in, or approximately in, the eutectic ratio, then distillation will be the first step by means of which the bulk of the ortho will be concentrated in the residue after removal of a fraction containing the bulk of the diphenyl. This residue will then be cooled to produce ortho-chlorodiphenyl crystals and an eutectic mother liquor.

With mixtures containing ortho- and para-chlorodiphenyls, inspection of Fig. II will show that if the para isomer be present in proportion less than that representing a eutectic mixture, cooling will be practiced to separate out ortho crystals in a mother liquor of ortho- and para-chlorodiphenyls. If, however, the para isomer be present in proportion greater than that representing a eutectic mixture, cooling will be practiced to separate out para-chlorodiphenyl crystals, and, again, if the constituents are present in, or approximately in, the eutectic ratio, distillation will be practiced first to concentrate the ortho isomer in the distillate and return the bulk of the para isomer in the residue to a previous step. The fraction thus obtained, high in ortho-chlorodiphenyl, will then be cooled to separate ortho crystals and the eutectic residue mother liquor returned to a previous step.

It will thus be seen that by alternate application of the steps of cooling and distillation, or distillation and cooling, as the composition may dictate, the para- and ortho-monochlorodiphenyls may be separated from a mixture thereof, and the diphenyl and ortho-chlorodiphenyl may be separated from a mixture thereof, and, further, that if in the original mixture a solvent be present a preliminary distillation may be practiced to eliminate it as the first distillate, either from an original mixture containing diphenyl and ortho-chlorodiphenyl, diphenyl, ortho- and para-chlorodiphenyls, or ortho- and para-chlorodiphenyls together with the solvent.

In the foregoing, we have described a procedure for separating a mixture of diphenyl, ortho- and para-chlorodiphenyls as obtained by the chlorination of diphenyl, but the mixture may be derived in other ways and with varying proportions of the constituents thereof. We have carried out the fractionation steps of our improved process under reduced pressure and a corresponding reduced temperature as well as under normal pressure with an equally satisfactory separation. Our improved process, or certain of the steps therein, may be further employed for purifying the individual compounds or for separating mixtures of two or more of them.

Other modes of applying the principle of our invention may be employed instead of the one explained, change being made as regards the details, provided the step or steps stated by any of the following claims or equivalent thereof be employed.

We therefore particularly point out and distinctly claim as our invention:—

1. The method of separating ortho-chlorodiphenyl and para-chlorodiphenyl from a mixture containing the same in non-eutectic proportion which comprises the step of precipitating one of said compounds as crystals from the liquid mixture by cooling to a temperature approximating, but not lower than the eutectic freezing point.

2. The method of separating ortho-chlorodiphenyl and para-chlorodiphenyl from a mixture containing the same in non-eutectic proportion which comprises the steps of precipitating one of said compounds as crystals from the liquid mixture by cooling to a temperature approximating, but not lower than the eutectic freezing point, and then distilling the mother liquor to separate a fraction consisting chiefly of ortho-chlorodiphenyl and leave a residual mixture containing a substantially higher proportion of para-chlorodiphenyl than corresponds to the eutectic mixture.

3. The method of separating diphenyl and ortho-chlorodiphenyl from a mixture containing the same in non-eutectic proportions which comprises precipitating one of said compounds as crystals from the liquid mixture by cooling to a temperature approximating, but not lower than the eutectic freezing point.

4. The method of separating diphenyl and ortho-chlorodiphenyl from a mixture containing the same in non-eutectic proportions which comprises precipitating one of said compounds as crystals from the liquid mixture by cooling to a temperature approximating, but not lower than the eutectic freezing point, and then distilling the mother liquor to separate a fraction containing a substantially higher proportion of diphenyl than corresponds to the eutectic mixture and leave a residue consisting chiefly of ortho-chlorodiphenyl.

5. In a method of the character described, the steps which consist in separating diphenyl from a mixture comprising mono-chlorodiphenyls and diphenyl by distilling said mixture to obtain a fraction consisting of diphenyl and ortho-chlorodiphenyl in non-eutectic proportions and crystallizing diphenyl from said fraction.

6. In a method of the character described, the steps which consist in crystallizing diphenyl from a mixture thereof with ortho-chlorodiphenyl in non-eutectic proportions until approximately an eutectic mixture of the compounds is formed and separating the diphenyl crystals from the liquid eutectic mixture.

7. In a method of the character described, the steps which consist in crystallizing diphenyl from a mixture thereof with ortho-chlorodiphenyl in non-eutectic proportions by cooling to a temperature of approximately 19° to 25° C. until approximately an eutectic mixture of the compounds is formed and separating the diphenyl crystals from the liquid eutectic mixture.

8. In a method of the character described, the steps which consist in crystallizing ortho-chlorodiphenyl from a mixture comprising ortho- and para-chlorodiphenyls in non-eutectic proportions until approximately an eutectic mixture of the compounds is formed, removing crystals of ortho-compound, and separating para-chlorodiphenyl by distilling the same from said eutectic mixture.

9. In a method for the purification of ortho-chlorodiphenyl the steps which consist of crystallizing ortho-chlorodiphenyl from a mixture comprising ortho- and para-chlorodiphenyls in non-eutectic proportions by cooling to a temperature of approximately 13° to 17° C. until approximately the eutectic mixture of said compounds is formed, removing the crystals of ortho-chlorodiphenyl, and separating para-chlorodiphenyl by distilling the same from the residue.

10. The method of separating a mixture consisting of diphenyl, ortho-chlorodiphenyl and para-chlorodiphenyl into the components thereof, which comprises separating said mixture by distillation into a fraction consisting of diphenyl and ortho-chlorodiphenyl in non-eutectic proportions and another fraction consisting of ortho- and para-chlorodiphenyl in non-eutectic proportions, and then separating by cooling each fraction into its components.

11. The method of separating a mixture consisting of diphenyl, ortho-chlorodiphenyl and para-chlorodiphenyl into the components thereof, which comprises separating said mixture by distillation into a fraction consisting substantially of diphenyl and ortho-chlorodiphenyl in non-eutectic proportions and another fraction consisting of ortho- and para-chlorodiphenyls in non-eutectic proportions, separating said first fraction by crystallizing out diphenyl by cooling, removing the crystals from the liquid residue and distilling the latter to obtain a distillate consisting substantially of diphenyl and ortho-chlorodiphenyl and a still residue consisting largely of ortho-chlorodiphenyl, crystallizing para-chlorodiphenyl from said second fraction by cooling, removing the crystals from the liquid residue and distilling the latter to separate a fraction consisting substantially of ortho-chlorodiphenyl therefrom.

12. The method of separating a mixture consisting of diphenyl, ortho-chlorodiphenyl and para-chlorodiphenyl into the components thereof, which comprises separating said mixture by distillation into a fraction consisting of diphenyl and ortho-chlorodiphenyl in non-eutectic proportions and another fraction consisting of ortho- and para-chlorodiphenyls in non-eutectic proportions, separating said first fraction by crystallizing out diphenyl by cooling to a temperature of about 19° to 25° C., removing the crystals from the liquid residue and distilling the latter to obtain a distillate containing practically all the remaining diphenyl and a portion of the ortho-compound leaving a residue consisting substantially of ortho-chlorodiphenyl, crystallizing para-chlorodiphenyl from said second fraction by cooling to a temperature of approximately 13° to 17° C., removing the crystals from the liquid residue and distilling said residue to obtain a distillate consisting substantially of ortho-chlorodiphenyl.

13. The method of separating a reaction mixture from the chlorination of diphenyl wherein mono-chlorinated diphenyls are the principal products, which comprises distilling said mixture to obtain a fraction consisting substantially of unreacted diphenyl and ortho-chlorodiphenyl in non-eutectic proportions and another fraction consisting of ortho- and para-chlorodiphenyls in non-eutectic proportions leaving a still residue of poly-chlorodiphenyl compounds, separating said first fraction by crystallizing out diphenyl by cooling to a temperature of about 19° to 25° C., removing the crystals from the liquid residue, distilling the latter to obtain a distillate containing practically all of the remaining diphenyl and a portion of the ortho-compound and leave a residue consisting substantially of ortho-chlorodiphenyl; crystallizing para-chlorodiphenyl from said second fraction by cooling to a temperature of approximately 13° to 17° C., removing the crystals from the liquid residue and distilling said residue to obtain a distillate consisting substantially of ortho-chlorodiphenyl.

14. In a method of separating ortho-chlorodiphenyl and para-chlorodiphenyl from a mixture containing the same, the steps which consist in distilling an approximately eutectic mixture of said compounds to obtain two fractions, the first of which contains ortho-chlorodiphenyl in a proportion greater than that present in an eutectic mixture of the above mentioned compounds, and the second of which contains para-chlorodiphenyl in a proportion greater than that present in an eutectic mixture of the two isomers, and cooling each of said fractions to a temperature approximating, but not lower than the eutectic freezing point, whereby ortho-chlorodiphenyl is crystallized from the first fraction and para-chlorodiphenyl is crystallized from the second.

Signed by us this 17th day of December, 1930.

EDGAR C. BRITTON.
WESLEY C. STOESSER.